United States Patent
Powell et al.

[15] 3,666,872
[45] May 30, 1972

[54] TEACHING MACHINE

[72] Inventors: Carroll E. Powell, 6501 Camden Avenue, Indianapolis, Ind. 46227; Clinton L. Carter, 9510 East Southport Road, Indianapolis, Ind. 46259

[22] Filed: Oct. 23, 1970

[21] Appl. No.: 83,447

[52] U.S. Cl. ..............................................35/9 A, 35/35 C
[51] Int. Cl. ...........................................................G09b 7/04
[58] Field of Search ..................35/6, 9 A, 9 B, 9 E, 35 C, 35/8 R; 161/3.5; 350/127

[56] References Cited

UNITED STATES PATENTS

| | | | |
|---|---|---|---|
| 3,052,041 | 9/1962 | Luxton et al. | 35/9 E |
| 3,142,909 | 8/1964 | Irazoqui | 35/35 C |
| 3,579,856 | 5/1971 | Way | 35/8 R |
| 3,578,841 | 5/1971 | Elmer | 350/127 |

*Primary Examiner*—Wm. H. Grieb
*Attorney*—Trask, Jenkins & Hanley

[57] ABSTRACT

A teaching device having a film projector, a keyboard, a memory tape unit and logic circuitry for providing audio and visual presentations for instructional purposes. The presentation may consist of a word or object displayed on a screen which the user would identify by pressing keys on the keyboard. This response is compared with the correct one as coded on a segment of film. The memory tape unit records any auditory presentation and any spoken response by the user for comparison purposes, such as would be desired for learning of a language. Many presentations of the ways in which the machine is used permits it to be adapted to the proficiency of each user.

9 Claims, 9 Drawing Figures

Patented May 30, 1972

INVENTOR
CARROLL E. POWELL
CLINTON L. CARTER
BY
*Frank, Jenkins & Hanley*
ATTORNEYS Patented May 30, 1972 3,666,872

INVENTOR
CARROLL E. POWELL
CLINTON L. CARTER
BY
Trask, Jenkins & Hanley
ATTORNEYS INVENTOR
CARROLL E. POWELL
CLINTON L. CARTER
BY
Frask Jenkins & Hanley
ATTORNEYS

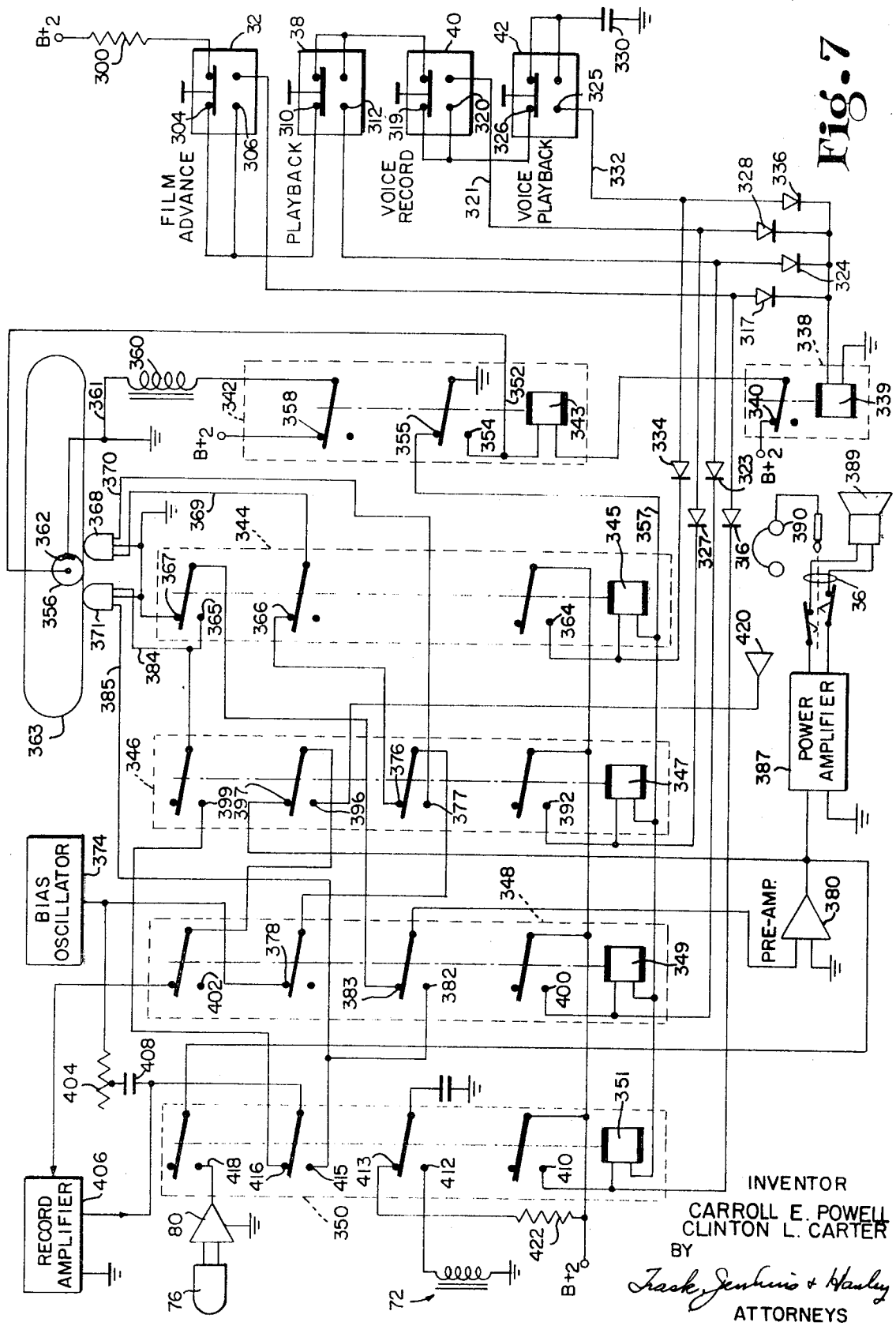

TEACHING MACHINE

BACKGROUND OF THE INVENTION

Learning experts have long been familiar with the theory that the highest degree of learning takes place when a student is subjected to individual instruction, but the situations where a one-to-one relationship between teacher and pupil is feasible are indeed rare.

The use of teaching machines generally have been advocated to simulate the functions of a human instructor with only a minimal amount of his time required for programming purposes, while providing means for a student to learn subject matter at a speed dictated by his capabilities and to the degree obtainable in individual instruction techniques.

The main difficulty heretofore encountered in such a teaching machine is the hardware restrictions placed on the number of important learning principles that can be facilitated. The learning theory most commonly depended on is the operant positioning technique advanced by Skinner. This method uses a short excerpt of instructional material followed by a series of questions. In a teaching machine such questions must be of the multiple choice variety so the machine can be programmed for each answer and what to do in the event that each occurs.

The negative aspect of the Skinner method when applied to a teaching machine is that a student has an excellent chance of simply guessing the correct answers and thereby progressing through a lesson without actually assimulating any of the material.

Another method or theory frequently used is that of brand or non-linear teaching. In this method, like the Skinner approach, material is presented followed by multiple choice questions. Unlike the Skinner method however, the presentation of material is not halted by an incorrect response and then continued when the answer is corrected. An incorrect answer in the non-linear technique either returns the presentation to a previous point for review of material not learned, or branches the presentation to a point where a more detailed explanation is advanced of the subject matter in the question. The machine embodying this method of instruction is weak in that the supplementary instructional material may not suffice to instruct the student as to his errors since the reasons behind the errors cannot always be anticipated.

SUMMARY OF THE INVENTION

To overcome the deficiencies of these methods and yet retain as exact a simulation of human instruction as plausible, the present invention employs movie sound film to present to the subject correctly pronounced, spoken information after which the subject can respond via a typewriter-like keyboard or a spoken response. If the keyboard response is correct, the film advances. Thus both visual and auditory stimuli are present. If the response is spoken, it, as well as the programmed statement, can be reheard as desired to facilitate learning by a repetitive technique. Through the appropriate pressings of labelled buttons on the keyboard console many variations in the mode of instruction can be obtained. For instance, in teaching the identification of displayed objects, the subject may type the name of the object and see the correct name appear letter by letter as he types it. On the other hand, if pronunciation is important an entire lesson can be proceeded through with the subject doing no more than the listening to the correct pronunciations or practicing his own pronunciations. The large number of variations in which material can be presented to the student, and which can be selected by the student himself, provides a degree of novelty to the learning process that previously has been absent from such machines. The ability to program the present invention using materials anyone can purchase inexpensively adds an economic advantage to it which is lacking in its predecessors.

BRIEF DESCRIPTION OF THE DRAWINGS

FIG. 7 is a schematic diagram of the control circuitry for the projector and the memory tape unit.

Figure 1:
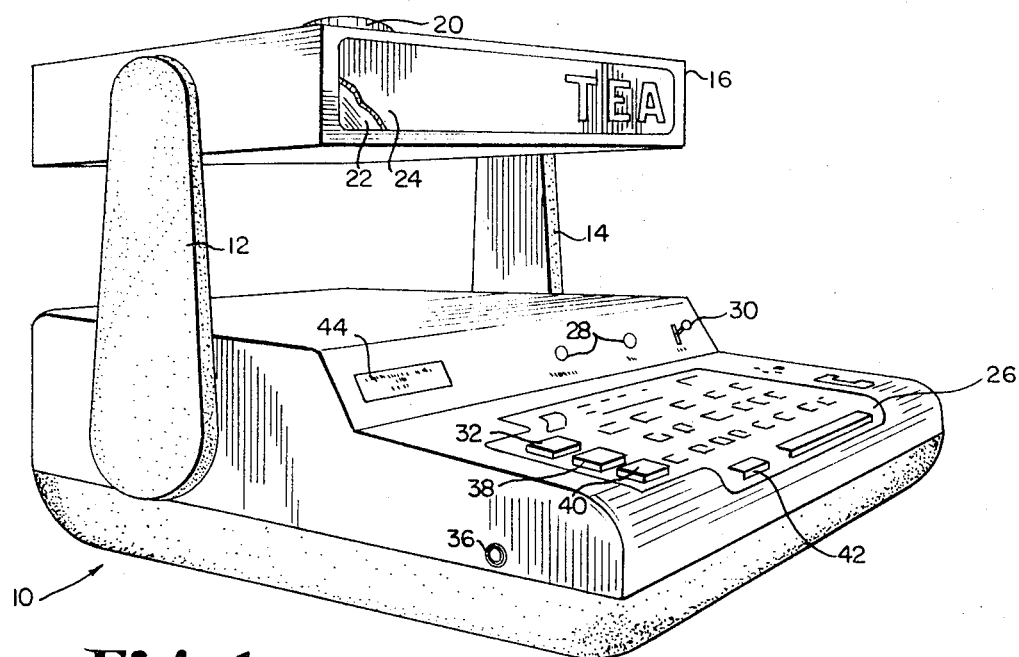
FIG. 1 is a perspective view showing a teaching machine embodying the invention.

A teaching machine in accordance with this invention is depicted in FIG. 1, and is composed of a base cabinet 10 onto which is mounted by two support arms 12 and 14, an upper cabinet 16. A rear door provides access to a film projector which is housed in the upper cabinet 16 and which projects selected frames of films, as they are drawn from a cartridge 20, upon a fresnel lens 22 with a circularly polarized overlay 24. A fresnel lens consists of a flat piece of glass into which has been ground a multiplicity of concentric grooves which are extremely close to one another near a center point but become increasingly further apart as the distance from the center point increases. By using such a piece of multiply grooved glass for the projection surface, a certain magnification of images projected thereon is obtained. This eliminates the problem of very small projected images due to the very short focal length mandated by the relatively small size of the upper cabinet 16. This circularly polarized overlay serves to eliminate the glare produced by ambient room lighting on the surface of the screen. This enables the invention to be used in full room light without the need for special environmental arrangements.

The base cabinet 10 contains a voice memory unit, a keyboard 26 in which is mounted the various function switches 28, and the related logic circuitry for controlling the machine's versatile operations. The teaching machine may be used to instruct a student in the use of a foreign language, and its operation will be described using that example. The instructional material for a foreign language consists of ordinary movie sound film on which is recorded a series of spoken words, and also a series of coded symbols which follow their respective words. The film is loaded in the film cartridge 20 and the machine turned on with the ON-OFF switch 30. To begin, the student would push the film advance button 32 after which he would hear the word spoken correctly. Either a loud speaker (not shown) in the rear of the base cabinet or headphones using the jack 36 in the side of the base cabinet 10 can be used for the auditory presentation.

After hearing the word spoken the student would attempt to type the word correctly. As a correct letter is typed it appears on the screen. This continues until the entire word is displayed. If a key of an incorrect letter is pressed neither the incorrect nor the correct letter appears on the screen 22. To hear the word again the student can press the playback button 38. After the entire word is displayed the student can again press the playback button 38 and hear the pronunciation as many times as desired, thus receiving a simultaneous auditory and visual presentation of the word.

Should spelling be, at some time, of minimal value to the subject, it is possible for him to proceed through as many words as he desires pronouncing the words himself for immediate playback. This is accomplished by pushing the voice record button 40 prior to speaking the word, and then pushing the voice playback button 42 to hear his own practice attempt. The voice memory unit uses a piece of memory tape fastened in a continuous loop. When such pronunciation practice is being done, the amount of time remaining in the recording period is shown in an indicator window 44 above the keyboard 26.

Figure 2:
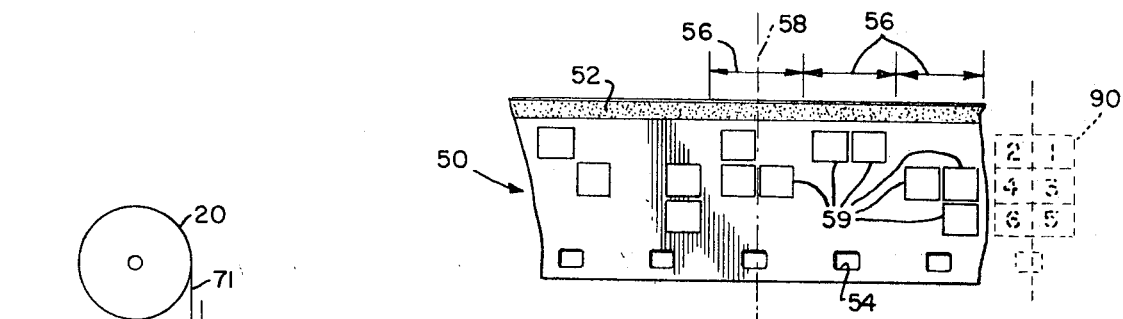
FIG. 2 shows a segment of coded movie film.

FIG. 2 illustrates an enlarged segment of film 50. The film 50 has a continuous thin strip of magnetic tape 52 along one edge. The opposite edge is perforated by spaced sprocket holes 54 to provide the means by which the film is advanced through its projector. As shown, the film is divided into frames 56 each of whose median line 58 intersects a sprocket hole 54. For a typical learning situation as indicated above, the correct pronunciation of a word would be recorded on the magnetic strip 52. The film frames 56 adjacent to such strip would contain the actual letters (not shown) for projection on the screen 22, and, following these, the word written in code blocks 59, allowing one letter to a frame.

To form the code, each frame is divided into six blocks 1–6 as shown. By making these blocks either black or clear a great many combinations can be formed. In the code illustrated here, each letter of the alphabet has a specific pattern of dark spaces assigned to it as shown in the following chart where an X represents the blocks darkened to form the code for the respective letters. As can also be seen from this chart block 6 is not used in the letter codes but can be utilized to control other functions of the teaching machine such as for skipping letters or words when it appears blackened. As the correct keys on the keyboard are pushed, the logic circuitry detects congruence between the key pushed and the appropriate coded letter, thereafter initiating a signal which steps the film strip one frame so the letter is in the proper position to be displayed on the viewing screen.

| CODE BLOCK | 1 | 2 | 3 | 4 | 5 |
|---|---|---|---|---|---|
| A |   |   | X | X | X |
| B |   | X | X |   |   |
| C | X |   |   | X | X |
| D |   | X | X |   |   |
| E |   | X | X | X | X |
| F |   | X |   |   | X |
| G | X |   | X |   |   |
| H | X | X |   | X |   |
| I | X |   |   | X | X |
| J |   |   | X |   | X |
| K |   |   |   |   | X |
| L | X |   | X | X | X |
| M | X | X |   | X |   |
| N | X | X |   |   | X |
| O | X | X | X |   |   |
| P | X |   |   | X |   |
| Q | X | X | X |   | X |
| R | X |   | X |   | X |
| S |   | X |   | X | X |
| T | X | X | X | X |   |
| U |   |   |   |   | X |
| V | X | X |   | X | X |
| W |   |   | X | X | X |
| X | X |   | X | X | X |
| Y |   | X |   | X |   |
| Z |   | X | X | X |   |

Figure 3:
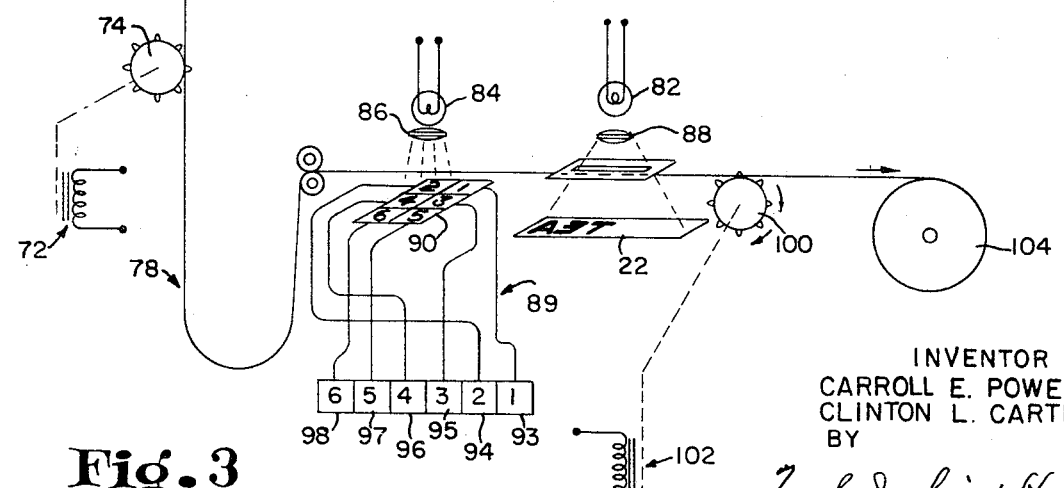
FIG. 3 shows the path the movie film follows and the elements associated therewith.

The path the film follows as its various messages are heard, projected and decoded is shown in FIG. 3. The film 71 is loaded on to supply reel or cartridge 20 and placed in the teaching machine. When the film advance clutch coil 72 is energized, the sprocket wheel 74 makes one revolution pulling the film 71 over the film playback head 76 and forming a loop 78. As the film 71 passes over the playback head 76, the auditory message recorded on the magnetic strip 52 is detected and fed to the film playback preamplifier 80.

The film's frames are arranged during its preparation such that when a frame with a letter imposed thereon is in front of the projecting lamp 82, a frame containing a code for the next letter is disposed in front of the decoding lamp 84. In this manner, the letter in front of the decoding lamp is always the next one to be displayed by the projecting lamp. The decoding lamp 84 is focused by lens 86 on only one frame at a time, but the projection lamp 82 is able, through the use of slit 88, to project an entire word, the length of which is limited by the slit.

For instance, if the word "PATENT" is to be projected one letter at a time, and the letters "PAT" are in front of the projecting head and thus being projected on the screen, the coded frame for the letter E would be in front of the decoding lamp 84.

The reading apparatus for this code is constructed of five wires 89 made of a fiber optic material and held in place by a frame 90 so that the ends of these optic wires are exposed, each to a respective block of a coded frame.

The endings of the fiber optic material wires may be located in a very small area such as a film frame. Each of these so called optic wires 89 leads from its position on the locating frame 90 to a photo resistor 93–98. As shown, the optic wire in position 1 goes to photo resistor 93; the wire in position 2 goes to photo resistor 94; the wire in position 3 goes to photo resistor 95; the wire in position 4 goes to photo resistor 96; the wire in position 5 goes to photo resistor 97; and the wire in position 6 goes to photo resistor 98. The sixth position, however, as indicated earlier, is not used at present.

The film strip is pulled across the projecting and decoding positions by a sprocket wheel 100 which is connected to a rotary stepper switch, whose coil 102 is energized, when the letter that is decoded and the letter that corresponds to the key being pressed on the keyboard are in congruence. From the sprocket wheel 100 the film is taken up by a reel 104.

One of the many possible variations available through programming adaptations would be to have the word spoken and shown concurrently. The subject would have to then translate the word to another language by typing. The coded word in this instance would be the translation of the projected word.

Figures 4, 4A:
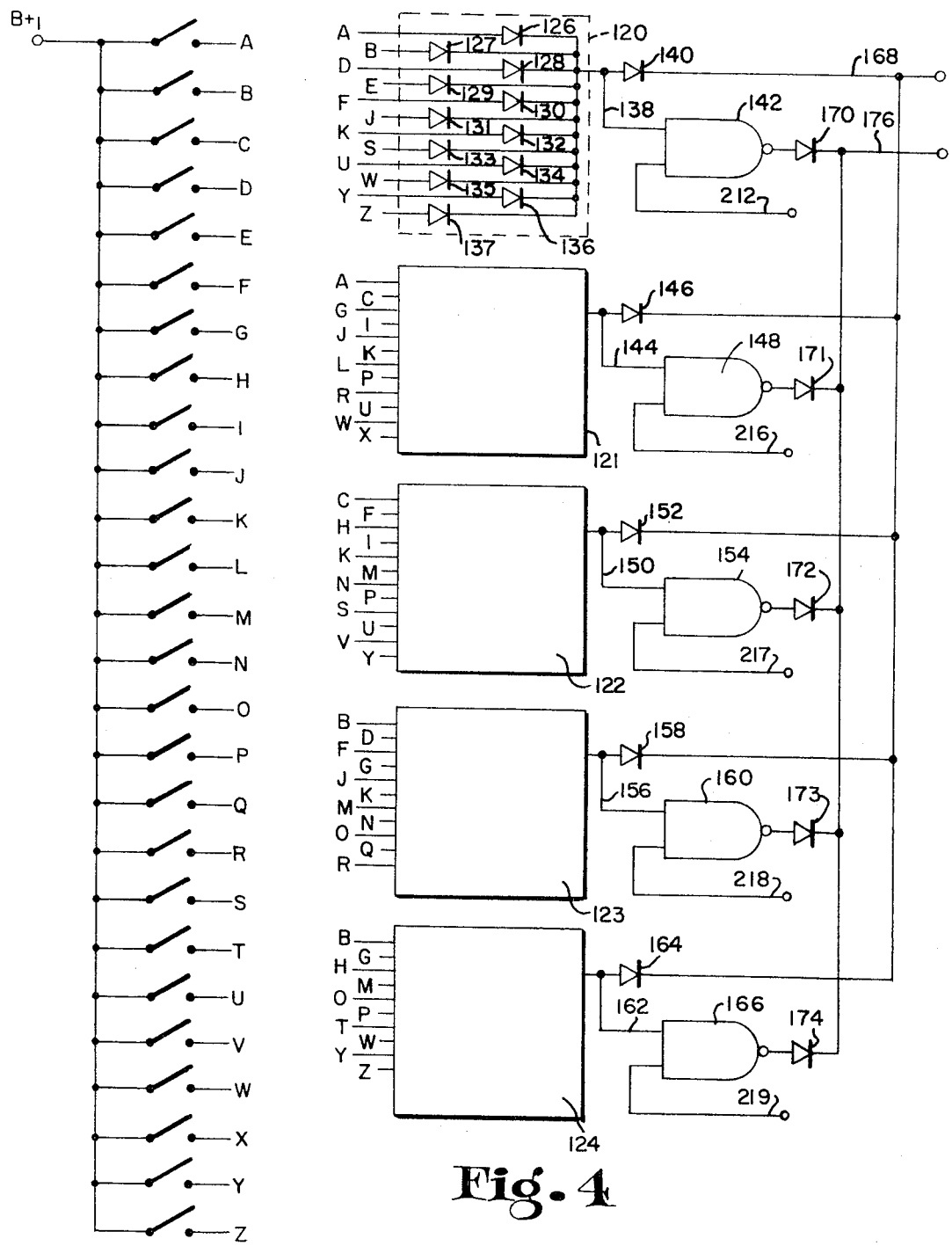
FIG. 4a is a schematic diagram for the keyboard switch circuitry.
FIG. 4 is a schematic diagram for the keyboard decoding circuitry.
Figures 5, 5A, 6:
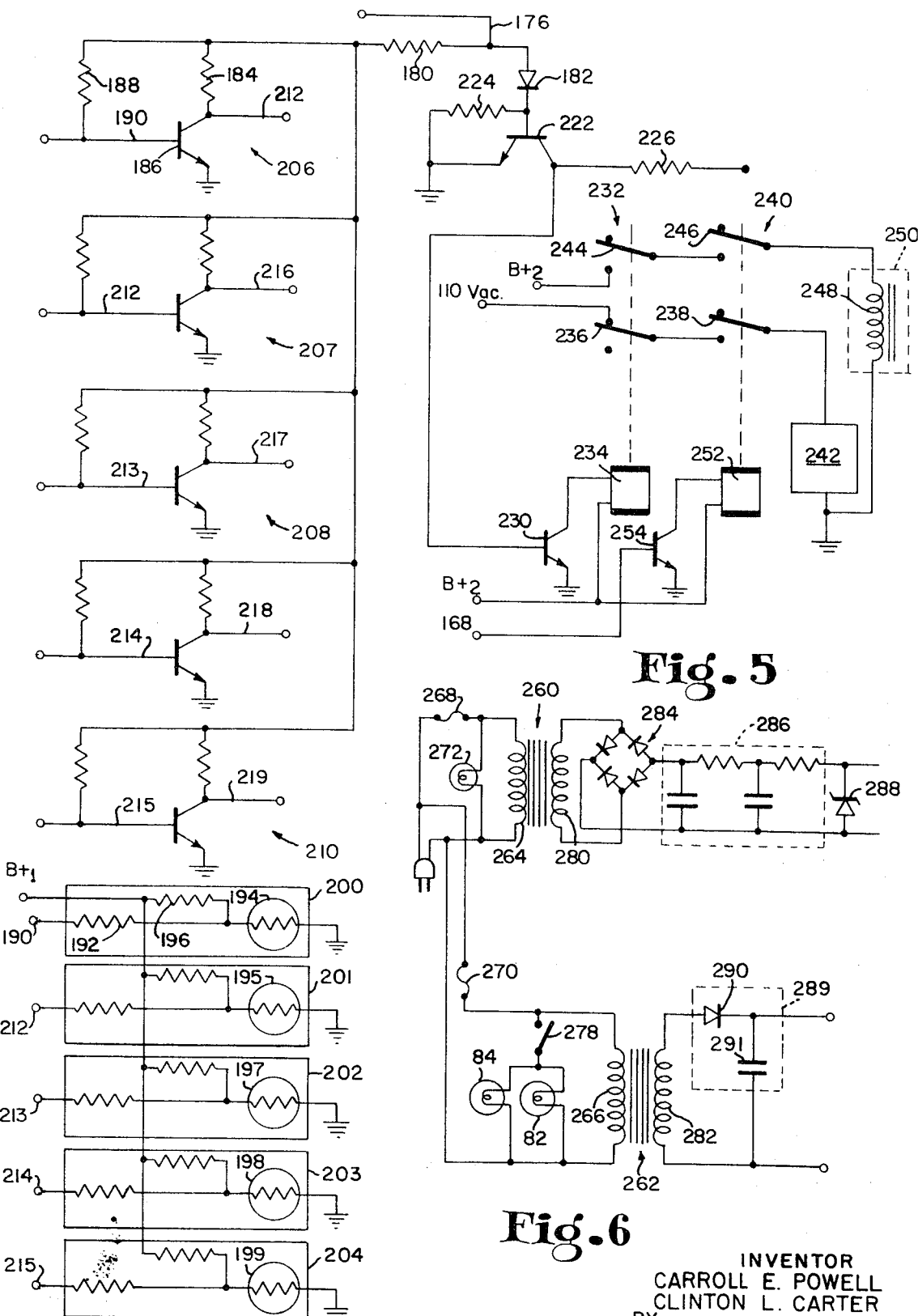
FIG. 5a is a schematic diagram for the photo resistor circuitry.
FIG. 5 is a schematic diagram for the photo resistor amplifier and comparison circuitry.
FIG. 6 is a schematic diagram for the power supply circuitry.

The logic and photo-sensitive circuitry used to decode the words on the film strip and ascertain congruence with the keyboard keys pressed is shown in FIGS. 4 and 5. The keys are depicted as normally open switches A–Z which are closed when their respective keys are pressed. The outputs from the switches A–Z are connected as shown in FIG. 4 between the $B+_1$ voltage and the anodes of diodes arranged in five groups 120–124. The first group 120 is exemplary of each of the groups and will be used as a representative thereof. Group 120 consists of twelve diodes 126–137 having their cathodes connected to a conductor 138 which in turn is connected to the anode of a diode 140 and to an exclusive OR gate 142. The diodes' anodes are connected respectively to switches A, B, D, E, F, J, K, S, U, W, Y, and Z. In a similar manner the second diode group has its anodes connected to switches A, C, G, I, J, K, L, P, R, U, W, and X; the third group has its anodes connected to switches C, F, H, I, K, M, N, P, S, U, V and Y; the fourth group's anodes are connected to switches B, D, F, G, J, K, M, N, Q, and R; and the fifth group's anodes are connected to switches B, G, H, M, O, P, T, W, Y and Z. Likewise the second group's cathodes are connected by a conductor 144 to the anode of a diode 146 and to an exclusive OR gate 148; group three's cathodes are connected by conductor 150 to the anode of diode 152 and to exclusive OR gate 154; group four's cathodes are connected to a conductor 156 which is connected to diode 158 anode and to exclusive OR gate 160; and the cathode of diode group five are connected, via a conductor 162 to the anode of diode 164 and to exclusive OR gate 166.

The cathodes of the diodes 140, 146, 152, 158 and 164 are all connected to conductor 168. The outputs of the exclusive OR gates 142, 148, 154, 160 and 166 are connected respectively to the anodes of diodes 170–174. The cathodes of these diodes are connected to a conductor 176.

When one of the keys is pressed, thereby closing one of the switches A–Z, the $B+_1$ voltage is connected to the appropriate diodes in the five groups 120–124. For example, when the A key is pressed, the A switch is closed, thus placing the $B+_1$ voltage on the anode of the proper diode in diode groups 120 and 121. This forward biases these diodes, and the $B+_1$ voltage thus appears, in this case, on conductors 138 and 144, which make it available to the input of the exclusive OR gates 142 and 148 and, through the forward biasing of diodes 140 and 146, on conductor 168. Each of the keyboard switches operates in this manner, to put $B+_1$ voltage on conductor 168 and one input of the appropriate exclusive OR gates 142, 148, 154, 160 and 166.

As seen in FIG. 5 and FIG. 5a, conductor 176 is connected to a resistor 180 and the anode of a diode 182. The other side of the resistor 180 is connected through a resistor 184 to the collector of an NPN transistor 186 and through a second resistor 188 to a conductor 190 which, in turn, is connected to the base of the same transistor 186 and to a resistor 192. The other side of resistor 192 is connected to a photo resistor 194 and, through another resistor 196 to the $B+_1$ voltage. The remaining side of the photo resistor 194 is grounded. These two resistor and photo resistor circuits 200 are representative of the remaining four such circuits 201, 202, 203 and 204.

The above grounded emitter transistor 186 and the two resistors associated with it form the amplifier for the photo resistor circuit's 200 output on conductor 190. The amplifier's 206 output on conductor 212 connected to the transistor's 186 collector is used as the other input for the first exclusive OR gate 142 in FIG. 4. The remaining four photo resistor circuits 201–204, output conductors 212–215, are connected to the bases of transistor amplifiers 207–210. These amplifiers are identical to amplifier 206 already described. Like the first amplifier 206, the four others are connected to resistor 180. Their outputs on conductors 216–219 are connected to the input of their respective exclusive OR gates 148, 154, 160 and 166.

As described above, conductor 176 is also connected to the anode of a diode 182. This diode's cathode is connected to the base of a grounded emitter NPN transistor 222 and through a resistor 224 to ground. A resistor 226 is connected between the collector of transistor 222 and the $B+_1$ voltage for biasing purposes. The collector is also connected by a conductor 228 to the base electrode of another NPN transistor 230 which is also connected in the common emitter configuration. Connected between this transistor's collector electrode and the $B+_2$ voltage line and acting as the transistor's load is the coil 234 of a relay 232. The normally closed contact 236 of relay 232 is connected between the 110 VAC and the normally open contact 238 of another relay 240. The other side of the second contact 238 is connected to a counter 242 whose other side is grounded. A second pair of contacts 244 and 246 in these relays 232 and 240, both normally open, connect the $B+_2$ voltage to the coil 72 of a rotary stepper switch 250. The other side of this coil 248 is grounded.

The coil 252 of the second relay 240 is connected between the $B+_2$ voltage line and the collector electrode of an NPN grounded emitter transistor 254. The base electrode of this transistor 254 is connected to the conductor 268, whose other connections were previously described.

When a coded film frame, with its combination of six black or clear blocks, is positioned in front of the photo resistor reading apparatus the photo resistors adjacent a clear block of film are switched on by the light coming through these clear blocks.

With reference to the above decoding chart, assume that the film frame in front of the decoding frame is coded for the letter A. In this case, therefore, blocks 1 and 2 of the coded frame would be clear. Therefore, photo resistors 194 and 195 would be in the "ON" state. In turning on, the voltage drop across the devices is reduced to zero. Therefore, since their outputs are grounded, their inputs are also held at ground potential, which in this case is zero volts. The voltage, therefore, on conductors 190 and 212 is also reduced to zero, thereby turning off the transistor amplifiers 206 and 207. The remaining photo resistors 197–199, remain in the off state, holding a plus voltage on their inputs. This voltage is applied to conductors 213–215 and thus to the bases of the transistors in amplifiers 208–210, whereby these transistors are held in their "ON" state. By turning off transistor amplifiers 206 and 207, the transistors' collectors are no longer at ground potential but instead have a positive potential. This positive voltage is simply the biasing potential obtained by each of these transistor amplifiers 206–210 through resistor 180.

When the potential on the collectors of these two amplifiers 206 and 207 goes positive, the voltage on conductors 212 and 216 also goes positive. As may be seen in FIG. 4, these two conductors also serve as inputs to the exclusive OR gates 142 and 148.

The operation of an exclusive OR gate is such that when either both inputs are positive or both inputs are negative the output becomes negative. However, when either of the inputs is positive and the other remains negative the output goes positive. Thus in our example, both inputs going positive causes the output to go negative and removes the positive voltage from conductor 176. When this occurs, the positive voltage is removed from resistor 180, thereby removing the positive voltage on the outputs of amplifiers 206 and 207. The next time a letter key is pressed, a positive voltage appears on one input to one or more of the exclusive OR gates in the manner explained above, thereby providing the positive voltage to bias the photo resistor amplifier circuits.

Before the positive voltage is removed from conductor 176 it maintains transistor 222 in its ON state since this voltage is applied through diode 182 to this transistor's base. If an incorrect key had been pressed, one of the exclusive OR gates would not have both inputs the same, thus maintaining a positive voltage on its output, and transistor 222 would remain on. When the positive potential is removed, however, by pressing a correct key, transistor 222 returns to the OFF state, thereby returning its collector to a potential approximately equal to the $B+_1$ voltage. When this occurs, transistor 230 is switched to its ON state, thus grounding its collector and energizing the coil 234 of relay 232. As can be ascertained from FIG. 5, the coil 252 of its companion relay 240 has already been energized due to the positive voltage on conductor 168 which was applied to the base of its switching transistor 254. Since a positive voltage appears on conductor 168 every time a key is pressed, and the voltage appears on conductor 228 only when a correct key is pressed, a counter 242 is connected, between ground and 110 VAC by normally open contact 238 of relay 240 and the normally closed contact 236 of relay 232. Whereby each time relay 240 is energized and relay 232 is not, the counter counts one count. If on the other hand, both relays are energized the normally closed contact on relay 232 is opened, breaking the counter's connection to the 110 volts and thus a count does not occur. This can be used to monitor the numbers of incorrect key pressings.

When both relay coils are energized the $B+_2$ voltage is connected, by means of normally open contacts 244 and 246, to the coil 248 of a rotary stepping switch 250. Whenever a right answer occurs, the coil of the stepping switch 250 is energized, and the film is advanced one frame.

The power supply from which the $B+_1$ voltage and $B+_2$ voltage are obtained is shown in FIG. 6. Line voltage 110 VAC, is applied across the two step-down transformers 260 and 262. In series with one leg of the primary side 264 and 266 of each of these transformers is a fuse 268 and 270. Also across the primary leads of transformer 260 is a light 272 which glows to show that power has been applied to the teaching machine. In a similar manner, the projection light 82 and the decoding light 84 can be applied across the primary 266 of transformer 262 by closing normally open switch 278. The output of the secondary 280 of transformer 260 is full wave rectified by diode bridge 284, and further filtered by resistor-capacitor clamping circuit 286. This diode bridge 284 and diode clamping circuit 286, in conjunction with zener diode 288, provide an output voltage $B+_1$ having little or no ripple.

The secondary 282 of transformer 262 is connected to a half wave rectifying circuit 289 consisting of diode 290 and capacitor 291 in parallel. The $B+_2$ voltage is obtained from the output of circuit 289.

FIG. 7 contains the control circuitry associated with the film projector and the memory tape unit. A resistor 300 is connected between the $B+_2$ voltage and one side of a normally closed (NC) contact in the film advance switch 32. The other side of this NC contact in the switch 32 is connected to one side of a normally open (NO) contact 306 in the same switch 32 and to a NC contact 310 in the playback switch 38. The other side of the NO contact 306 in the film advance switch is connected to a conductor 314 which is connected to the anodes of two diodes 316 and 317.

The other side of the NC contact 310 in the playback switch 38 is connected to a NO contact 312 in the same switch 38 and to the NC contact 319 in the voice record switch 40. The other side of the playback switch's NO contact 312 is connected by a conductor 322 to the anodes of diodes 323 and 324. The voice record switch's 40 NC contact 319 is connected to the switch's NO open contact 320 and to a NC contact 326 in the voice playback switch 42.

The other side of the NO contact 320 in the voice record switch 40 is connected by a conductor 326 to the anodes of two diodes 327 and 328. The other side of the NC contact 326 in the voice playback switch 42 is connected to the switch's NO contact 327 and to ground through a large capacitor 330. The voice playback switch's NO contact 327 is also connected by a conductor 332 to the anodes of two diodes 334 and 336.

When any of the above switches is pressed, a positive voltage is applied across its respective normally open contact to the anodes of the appropriate diodes. Connecting these switches in this manner described enables only one switch to be used at any given time.

Diodes 317, 324, 328 and 336 have their cathodes connected together and to one side of a relay 338 and coil 339 whose other side is grounded. The relay's normally closed contact 340 is connected between the $B+_2$ voltage and one side of a coil 343 in another relay 342. The other side of this coil 343 is connected to a conductor 352 which is connected to a NO contact 354 and to the axis of the control disk 356 in the memory tape unit. The other side of this normally open contact 354 and its companion normally closed contact 355 is grounded. The remaining side of the normally closed contact 355 is connected to a conductor 357 which serves as a common connection for the coils 345, 347, 349 and 351 in the remainder of the relays 344, 346, 348 and 350.

The remaining normally closed contact 358 in relay 342 is connected between the $B+_2$ voltage and the motor clutch coil 360 which has its other side connected to a conductor 361. This conductor 361 serves to connect the motor clutch coil 360 to a metallic spot 362 on the memory tape unit control disk 356 when the disk is in the proper arcuate position. This metallic spot 362, on the otherwise non-conductive surface of the control disk, is connected via the disk's metallic core to the axis upon which the disk rotates.

The positive voltage placed on the diodes 317, 324, 328 and 336 forward biases them, thus the same positive voltage is applied to the one side of relay coil 339 thereby energizing it and opening contact 340. When this occurs the $B+_2$ voltage is removed from coil 343 in relay 342 thereby de-energizing it. When normally closed contact 358 then closes, the $B+_2$ voltage is applied to the motor clutch coil 360 of the memory tape unit. When the motor clutch coil 360 picks up, the control disk 356 starts to rotate, thereby passing the tape loop 363 over the record and play head 371 and the erase head 368.

In the meantime, the switch 32, 38, 40 or 42 that was pressed returns to is normal position enabling the coil 339 in relay 338 to drop out, allowing contact 340 to close again. $B+_2$ voltage is thus again applied to coil 343.

When the metallic spot 362 returns to its starting position it makes contact with the conductor 361 which is grounded. In doing so, the axis of this control disk 356 is also grounded, thereby applying ground potential to conductor 352 and subsequently energizing relay coil 343 which is latched in through NO contact 354. When this occurs, the $B+_2$ voltage is removed from the motor clutch coil 360, and it is de-energized, stopping the control disk from rotating. Graduations on the disk's surface can be seen through indicator 44 as the disk rotates, thereby informing the user as to the amount of time left in each recording period.

When the voice playback switch 42 is pressed, a positive voltage appears on conductor 332 which energizes coil 345, closes normally open contacts 364 and 365, and opens normally closed contacts 366 and 367. The closing of contact 364 merely latches the relay coil 345 in.

The opening of normally closed contact 366 disconnects track No. 1 terminal 369 on the erase head 368 in the memory tape unit from the bias oscillator 374. This connection was originally formed by NC contact 366, NC contact 376 in relay 346 and NC contact 378 in relay 348. This connection is broken to prohibit erasure of the memory tape when voice playback is taking place.

The opening of normally closed contact 367, and thus the closing of normally open contact 365, removes the ground connection from the input to the pre-amp 380 through NC contact 383 in relay 348, and connects the record and play head 371 No. 2 track output 384, to the input of the pre-amp 380. Thus, when the voice playback button is pushed and the memory tape, under the control of the memory tape control disk, passes over the record and play head 371, the voice recorded thereon is detected by the play head 371, amplified in the pre-amp 380 and power amp 387 and broadcast through earphones 390 or loudspeaker 389. The headphone jack 36 as is standard practice, disconnects the loudspeaker when he headphones are plugged.

Looking now at relay 346, its coil 347 is energized by a positive voltage being applied across diode 327 when the voice record button 40 is pressed and is latched in by its own NO contact 392. Contacts 377 and 376 are simultaneously closed and opened when this occurs, to provide a path from the track No. 2 terminal 369 on the erase head 368, through NC contact 378 in relay 348 to the bias oscillator 374 and to one side of the bias adjust resistor 404; and, to interrupt the path from the track No. 1 terminal 369 of the erase head 368 through NC contact 366 in relay 344 and NC contact 378 in relay 348 to the bias oscillator 374 and bias adjust resistor 404.

Closing NO contact 396 provides continuity between the input microphone 420 and the input terminal of the recording amplifier 406 by way of NC contact 402 in relay 348. Its companion NC contact 397 is opened, thus breaking the path from the film playback pre-amp 80 since it is not to be used in the voice record mode. The closing of normally open contact 399 provides electrical continuity between the output of the recording amplifier 406 through NC contact 416 in relay 350 to the No. 2 track output 384 of the record and play head in the memory tape unit. Thus, when the voice record button 40 is pressed, track No. 2 of the memory tape 363 is first erased and then recorded with whatever is spoken into the microphone 420.

When the button 38 is pressed to play back the film message from the memory tape unit, a positive voltage is applied across diode 323 to the coil 349 of relay 348, which then latches itself in through NO contact 400. By means of NO contact 382, which then closes, track No. 1's terminal 385 of the record and play head 371 is connected to the input of the pre-amp 380. NC contact 378 opens to break the electrical path from the bias oscillator 374 and bias adjust resistor 404 to No. 1 track side 369 of the erase head 368 because no erasure is desired in the playback mode.

NC contact 402 is also opened, thereby disrupting the electrical path from the power amplifier's 387 input to the input of the recording amplifier 406. This is done because no recording takes place in the playback mode.

The last of the relays 350 has its coil 351 energized by the pressing of the film advance switch 32. It is then latched in by the closing of its NO contact 410. Before coil 504 was picked up, however, a charging path for capacitor 420 was provided through relay 350 NC contact 413 and charging resistor 422, which has its one side connected to the $B+_2$ voltage. When the relay 502 is picked up NO contact 412 closes thereby applying the charge on the capacitor 420 to the film advance clutch coil 72. The picking up of this coil 72 allows the next segment of film to be advanced, forming a loop of film at the input to the projector head which is decreased one frame at a time as the correct keys are pressed on the keyboard.

When NO contact 415 closes, the output of the recording amplifier 406 is connected to the No. 1 track terminal 385 of the record and play head 371. NO contact 418 is also closed at this time, so that the film playback head 76 and pre-amplifier 80 are connected to the input of the recording amplifier 406 and to the power amplifier 387. In this manner, when the film advance switch 32 is pressed, the film advance clutch is energized, passing a segment of film over the film playback head 76 whose output is connected through the pre-amp 80, to the input of the recording amplifier 406 and to the input of the power amplifier 387. The output of the recording amplifier 406 is connected to the recording head 371 of the memory tape unit, and the output of the power amplifier 387 is connected to a loudspeaker 389 or to head phones 390, thereby recording what is on the film head and audibly presenting it to the subject.

We claim:

1. A teaching machine which comprises, a keyboard having a plurality of input keys designated for use as pupil input; means to visually display prerecorded information with an accompanying audio explanation including a picture projector employing a photographic film strip having a sound track recorded thereon; means to repetitively present said audio explanation when desired; means to record the verbal response of a pupil for presentation when desired; means to compare said pupil input with said prerecorded information which includes coded film, light sensitive circuit means to detect a code in said coded film, detection circuit means to detect said pupil input, and comparison circuit means to compare the output of said light sensitive circuit means with the output of said detection circuit means and to generate an appropriate output signal in accordance therewith; and means responsive to said output signal to inform the pupil when said pupil input and said prerecorded information are the same.

2. A teaching machine as set forth in claim 1 having means by which said teaching machine is impervious to the ambient light level of the environment in which it is used.

3. A teaching machine as set forth in claim 1 wherein said means to repetitively reproduce said audio explanation comprises one track of a multiple track memory tape loop whose movement is activated and stopped by a control disk, and said means to record the verbal response of the pupil includes a second track of said memory tape loop.

4. A teaching machine as set forth in claim 3 wherein the surface of said control disk includes visible indication means for indicating to the pupil the arcuate position of said control disk.

5. A teaching machine which comprises, a keyboard having a plurality of keys designated for use as pupil input; a film projector connected electrically to said keyboard and employing a film having visual and auditory information recorded thereon for presentation of such information whereby said projector has means to project a plurality of film frames simultaneously; a memory tape unit electrically connected to said keyboard and said projector which includes a recording tape loop, an on and off control disk for controlling the movement of said loop, and means to erase and record information on said loop; means to compare said pupil keyboard input with said visual information comprising coded film, an optical sensing circuit, switches connected to said keyboard and a logic comparison circuit; and a screen for presenting said visual information thereon, comprising a layer of fresnel lens and a layer of a circularly polarized material.

6. A teaching machine as set forth in claim 5 including means to count when said pupil keyboard input and said film code are not the same.

7. A teaching machine as set forth in claim 5 wherein said optical sensing circuit comprises a plurality of fiber optic wires and a corresponding plurality of photo resistors.

8. A teaching machine as set forth in claim 5 wherein said control disk includes a metallic core, a non-conductive surface and a conductive spot on said non-conductive surface connected to said metallic core for electrically grounding said core when said disk is in a proper arcuate position.

9. A teaching machine as set forth in claim 8 wherein said non-conductive surface includes visible indication means for indicating to the pupil the arcuate position of said control disk.

* * * * *